US006252698B1

(12) United States Patent
Oikawa

(10) Patent No.: US 6,252,698 B1
(45) Date of Patent: Jun. 26, 2001

(54) METHOD AND DEVICE FOR WAVELENGTH CONVERSION, AND SYSTEM INCLUDING THE DEVICE

(75) Inventor: Yoichi Oikawa, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/375,387

(22) Filed: Aug. 17, 1999

(30) Foreign Application Priority Data

Feb. 17, 1999 (JP) .................................................. 11-038068

(51) Int. Cl.$^7$ ................................ G02F 1/35; H01S 3/08; G02B 6/26
(52) U.S. Cl. .......................... 359/326; 359/117; 359/124; 359/127; 359/128; 359/246; 385/2; 385/11; 385/16; 385/24; 372/96; 372/106; 372/108
(58) Field of Search ..................................... 359/124, 125, 359/117, 127, 128, 134, 326, 246; 385/5, 11, 16, 24, 122, 2; 372/96, 106, 108, 21, 22

(56) References Cited

U.S. PATENT DOCUMENTS

| 5,400,164 | * | 3/1995 | Kurtzke et al. | 359/326 |
|---|---|---|---|---|
| 5,654,818 | * | 8/1997 | Yao | 359/246 |
| 5,751,868 | * | 5/1998 | Bala et al. | 385/16 |
| 5,920,588 | * | 7/1999 | Watanabe | 372/96 |
| 5,953,142 | * | 9/1999 | Chiaroni et al. | 359/127 |

OTHER PUBLICATIONS

David A. Smith, et al., Integrated–Optic Acoustically–Tunable Filters for WDM Networks, *IEEE Journal on Selected Areas in Communications,* vol. 8, No. 6, Aug. 1990, pp. 1151–1159.

* cited by examiner

*Primary Examiner*—Loha Ben
(74) *Attorney, Agent, or Firm*—Staas & Halsey, LLP

(57) ABSTRACT

Disclosed herein is a method for wavelength conversion. In this method, an optical signal received is separated into a first polarization component having a first polarization plane and a second polarization component having a second polarization plane perpendicular to the first polarization plane. The first polarization component is supplied to a first optical waveguide structure over which a first surface acoustic wave propagates, in a direction identical with the propagation direction of the first surface acoustic wave. The second polarization component is supplied to a second optical waveguide structure over which a second surface acoustic wave propagates, in a direction opposite to the propagation direction of the second surface acoustic wave. First converted light output from the first optical waveguide structure and second converted light output from the second optical waveguide structure are combined together. According to this method, the optical signal can be wavelength-converted with a high efficiency concerning a predetermined wavelength.

18 Claims, 11 Drawing Sheets

F I G. 7A
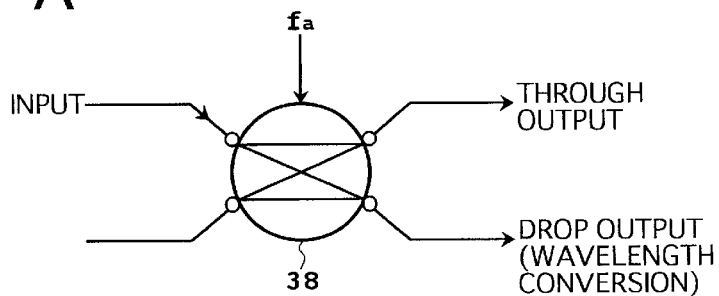
F I G. 7B
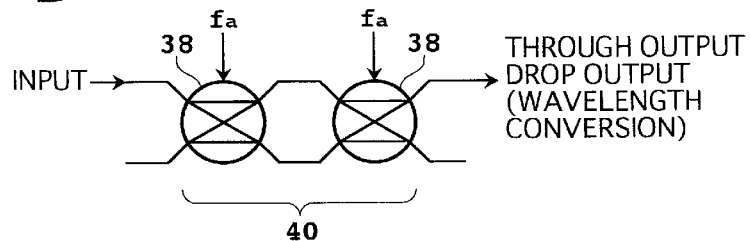
F I G. 7C
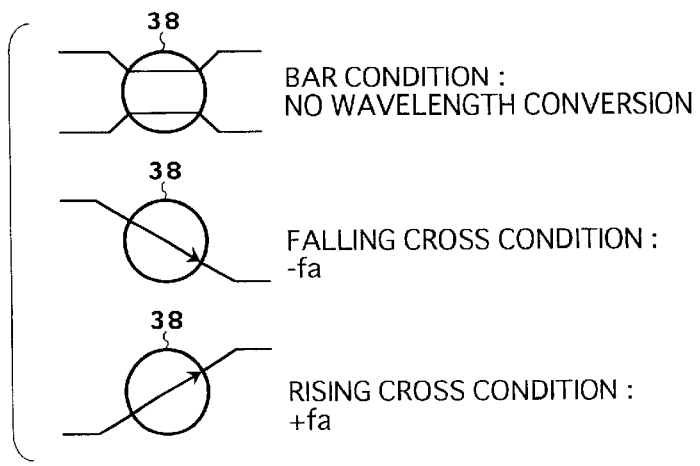

F I G. 10
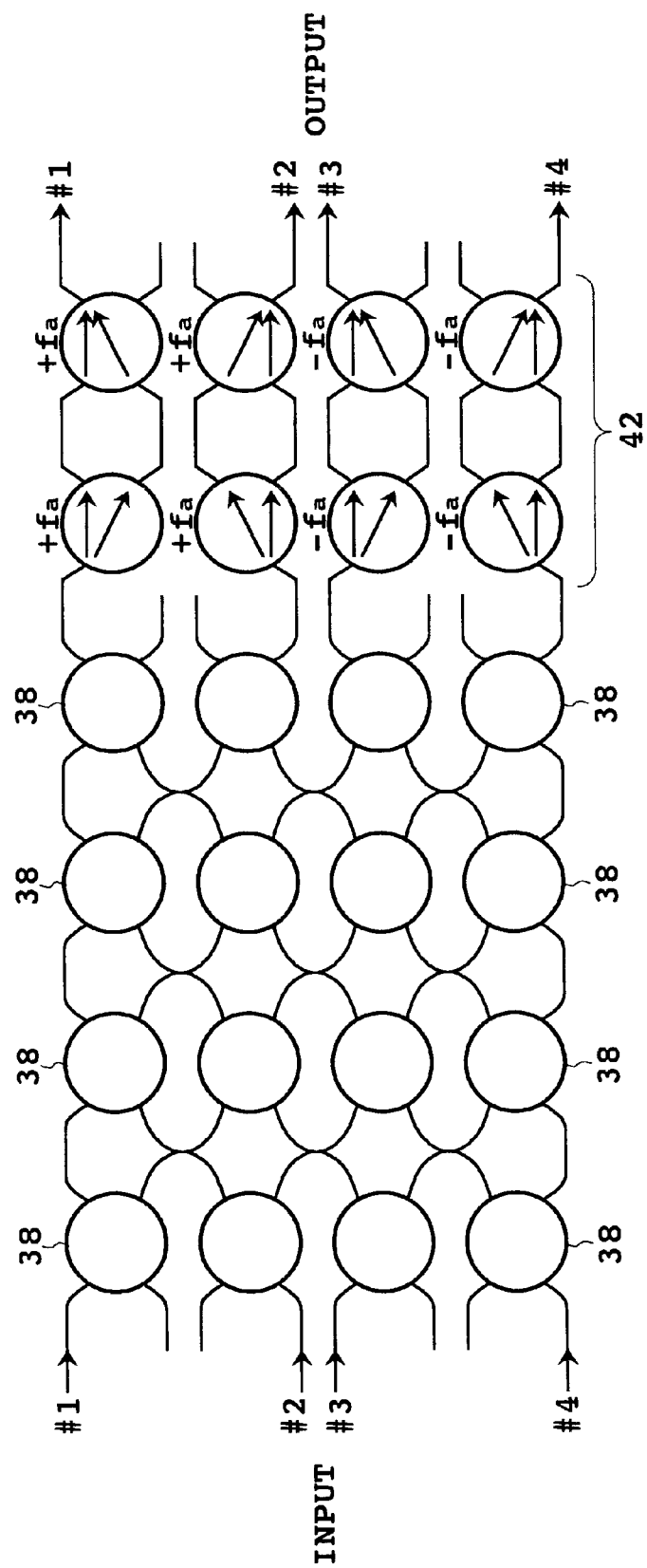

METHOD AND DEVICE FOR WAVELENGTH CONVERSION, AND SYSTEM INCLUDING THE DEVICE

BACKGROUND OF THE INVENTION

1. Field of the Invention

The present invention relates to a method and device for wavelength conversion, and a system including the device.

2. Description of the Related Art

As a technique for increasing a transmission capacity by a single optical fiber, wavelength division multiplexing (WDM) is known. In a system adopting WDM, a plurality of optical carriers having different wavelengths are used. The plural optical carriers are individually modulated to thereby obtain a plurality of optical signals, which are wavelength division multiplexed by an optical multiplexer to obtain WDM signal light, which is output to an optical fiber transmission line. On the receiving side, the WDM signal light received is separated into individual optical signals by an optical demultiplexer, and transmitted data is reproduced according to each optical signal. Accordingly, by applying WDM, the transmission capacity in a single optical fiber can be increased according to the number of WDM channels.

It is now being considered to construct a wide-area photonic network in the future by connecting WDM systems, and the development of a node configuration or an optical cross-connect (OXC) device required for such a photonic network is being pursued. The node is provided by an optical add/drop multiplexer (OADM) for extracting (dropping) an optical signal from a network and inserting (adding) an optical signal into the network. The optical cross-connect device is used to switch the paths of optical signals.

It is considered that direct connection of largely demanded IP packet information to a photonic network without through a current SONET/SDH device or ATM device will become a mainstream (IP over WDM). Accordingly, a wavelength converter for converting the wavelength of an optical signal is one of the key technologies for realization of such a photonic network.

Conventionally, research has been made on a method for wavelength conversion by generation of four-wave mixing with a semiconductor optical amplifier or a DFB laser.

However, the conventional method for wavelength conversion has a problem such that the efficiency of generation of converted light after wavelength conversion is very low. Further, a conventional device for wavelength conversion requires control light for generating four-wave mixing, causing a complicated configuration.

SUMMARY OF THE INVENTION

It is therefore an object of the present invention to provide a method for wavelength conversion which can achieve a high efficiency of generation of converted light.

It is another object of the present invention to provide a device for wavelength conversion which can achieve a high efficiency of generation of converted light with a simple configuration.

It is a further object of the present invention to provide a novel system including such a device.

In accordance with an aspect of the present invention, there is provided a method for wavelength conversion, comprising the steps of (a) separating an optical signal received into a first polarization component having a first polarization plane and a second polarization component having a second polarization plane perpendicular to the first polarization plane; (b) supplying the first polarization component to a first optical waveguide structure over which a first surface acoustic wave propagates, in a direction identical with the propagation direction of the first surface acoustic wave; (c) supplying the second polarization component to a second optical waveguide structure over which a second surface acoustic wave propagates, in a direction opposite to the propagation direction of the second surface acoustic wave; and (d) combining first converted light output from the first optical waveguide structure and second converted light output from the second optical waveguide structure.

The first and second optical waveguide structures are provided as a part of an acoustic optical tunable filter (AOTF), for example. In this case, the first polarization component having the first polarization plane and the second polarization component having the second polarization plane are polarization-converted to respectively have the second polarization plane and the first polarization plane, so that the first and second converted lights have the second and first polarization planes, respectively. Further, the first and second converted lights are frequency-shifted from the optical signal received by a quantity determined by the frequency of each surface acoustic wave, thereby effecting wavelength conversion of the optical signal. Since the wavelength of the optical signal to be wavelength-converted can be changed according to the frequency of each surface acoustic wave, an optical signal of an arbitrary wavelength channel in WDM signal light can be selectively wavelength-converted. The reason why the propagation direction of each surface acoustic wave is limited as described above is to make the direction of frequency shift from the first polarization component to the first converted light identical with the direction of frequency shift from the second polarization component to the second converted light. This will be hereinafter described in detail.

In accordance with another aspect of the present invention, there is provided a device for wavelength conversion, comprising a first polarization beam splitter having a first input port and first and second output ports, the first input port and the first output port of the first polarization beam splitter coupled by a first polarization plane, the first input port and the second output port of the first polarization beam splitter being coupled by a second polarization plane perpendicular to the first polarization plane; a first polarization converter having an input port and an output port, the input port of the first polarization converter being connected to the first output port of the first polarization beam splitter, the first polarization converter converting the first polarization plane into the second polarization plane concerning light having a predetermined wavelength; a second polarization converter having an input port and an output port, the input port of the second polarization converter being connected to the second output port of the first polarization beam splitter, the second polarization converter converting the second polarization plane into the first polarization plane concerning light having the predetermined wavelength; and a second polarization beam splitter having first and second input ports and a first output port, the first input port of the second polarization beam splitter being connected to the output port of the first polarization converter, the second input port of the second polarization beam splitter being connected to the output port of the second polarization converter, the first input port and the first output port of the second polarization beam splitter being coupled by the second polarization plane, the second input port and the first output port of the second polarization beam splitter being coupled by the first polarization plane; each of the first and second polarization converters having an optical waveguide structure over which a surface acoustic wave propagates; the propagation directions of the light and the surface acoustic wave in one of the first and second polarization converters being opposite to each other; the propagation directions of the light and the surface acoustic wave in the other of the first and second polarization converters being identical with each other.

In accordance with a further aspect of the present invention, there is provided a system comprising first to fourth optical fiber transmission lines each adapted to wavelength division multiplexing; and an optical add/drop multiplexer connected to the first to fourth optical fiber transmission lines; the optical add/drop multiplexer comprising a first polarization beam splitter having first and second input ports and first and second output ports, the first and second input ports of the first polarization beam splitter being respectively connected to the first and second optical fiber transmission lines, the first input port and the first output port of the first polarization beam splitter being coupled by a first polarization plane, the first input port and the second output port of the first polarization beam splitter being coupled by a second polarization plane perpendicular to the first polarization plane, the second input port and the first output port of the first polarization beam splitter being coupled by the second polarization plane, the second input port and the second output port of the first polarization beam splitter being coupled by the first polarization plane; a first polarization converter having an input port and an output port, the input port of the first polarization converter being connected to the first output port of the first polarization beam splitter, the first polarization converter converting the first polarization plane into the second polarization plane concerning light having a predetermined wavelength; a second polarization converter having an input port and an output port, the input port of the second polarization converter being connected to the second output port of the first polarization beam splitter, the second polarization converter converting the second polarization plane into the first polarization plane concerning light having the predetermined wavelength; and a second polarization beam splitter having first and second input ports and first and second output ports, the first input port of the second polarization beam splitter being connected to the output port of the first polarization converter, the second input port of the second polarization beam splitter being connected to the output port of the second polarization converter, the first input port and the first output port of the second polarization beam splitter being coupled by the second polarization plane, the first input port and the second output port of the second polarization beam splitter being coupled by the first polarization plane, the second input port and the first output port of the second polarization beam splitter being coupled by the first polarization plane, the second input port and the second output port of the second polarization beam splitter being coupled by the second polarization plane; each of the first and second polarization converters having an optical waveguide structure over which a surface acoustic wave propagates; the propagation directions of the light and the surface acoustic wave in one of the first and second polarization converters being opposite to each other; the propagation directions of the light and the surface acoustic wave in the other of the first and second polarization converters being identical with each other.

In accordance with a still further aspect of the present invention, there is provided a device for wavelength conversion, comprising a first polarization beam splitter having an input port and first and second output ports, the input port and the first output port of the first polarization beam splitter being coupled by a first polarization plane, the input port and the second output port of the first polarization beam splitter being coupled by a second polarization plane perpendicular to the first polarization plane; a first polarization converter having an input port and an output port, the input port of the first polarization converter being connected to the first output port of the first polarization beam splitter, the first polarization converter converting the first polarization plane into the second polarization plane concerning light having a first wavelength; a second polarization converter having an input port and an output port, the input port of the second polarization converter being connected to the second output port of the first polarization beam splitter, the second polarization converter converting the second polarization plane into the first polarization plane concerning light having the first wavelength; a second polarization beam splitter having first and second input ports and first and second output ports, the first input port of the second polarization beam splitter being connected to the output port of the first polarization converter, the second input port of the second polarization beam splitter being connected to the output port of the second polarization converter, the first input port and the first output port of the second polarization beam splitter being coupled by the second polarization plane, the first input port and the second output port of the second polarization beam splitter being coupled by the first polarization plane, the second input port and the first output port of the second polarization beam splitter being coupled by the first polarization plane, the second input port and the second output port of the second polarization beam splitter being coupled by the second polarization plane; a third polarization beam splitter having first and second input ports and first and second output ports, the first input port of the third polarization beam splitter being connected to the second output port of the second polarization beam splitter, the second input port of the third polarization beam splitter being connected to the first output port of the second polarization beam splitter, the first input port and the first output port of the third polarization beam splitter being coupled by the first polarization plane, the input port and the second output port of the third polarization beam splitter being coupled by the second polarization plane, the second input port and the first output port of the third polarization beam splitter being coupled by the second polarization plane, the second input port and the second output port of the third polarization beam splitter being coupled by the first polarization plane; a third polarization converter having an input port and an output port, the input port of the third polarization converter being connected to the first output port of the third polarization beam splitter, the third polarization converter converting the second polarization plane into the first polarization plane concerning light having a second wavelength having a predetermined relation to the first wavelength; a fourth polarization converter having an input port and an output port, the input port of the fourth polarization converter being connected to the second output port of the third polarization beam splitter, the fourth polarization converter converting the first polarization plane into the second polarization plane concerning light having the second wavelength; a fourth polarization beam splitter having first and second input ports and an output port, the first input port of the fourth polarization beam splitter being connected to the output port of the third polarization converter, the second input port of the fourth polarization beam splitter being connected to the output port of the fourth polarization converter, the first input port and the output port of the fourth polarization beam splitter being coupled by the first polarization plane, the second input port and the output port of the fourth polarization beam splitter being coupled by the second polarization plane; each of the first to fourth polarization converters having an optical waveguide structure over which a surface acoustic wave propagates; the propagation directions of the light and the surface acoustic wave in each of the first and fourth polarization converters being opposite to each other; the propagation directions of the light and the surface acoustic wave in each of the second and third polarization converters being identical with each other.

In accordance with a still further aspect of the present invention, there is provided a system comprising first and second optical fiber transmission lines; and a wavelength converter connected to the first and second optical fiber transmission lines; the wavelength converter comprising a first polarization beam splitter having an input port and first and second output ports, the input port and the first output port of the first polarization beam splitter being coupled by a first polarization plane, the input port and the second output port of the first polarization beam splitter being coupled by a second polarization plane perpendicular to the first polarization plane; a first polarization converter having an input port and an output port, the input port of the first polarization converter being connected to the first output port of the first polarization beam splitter, the first polarization converter converting the first polarization plane into the second polarization plane concerning light having a first wavelength; a second polarization converter having an input port and an output port, the input port of the second polarization converter being connected to the second output port of the first polarization beam splitter, the second polarization converter converting the second polarization plane into the first polarization plane concerning light having the first wavelength; a second polarization beam splitter having first and second input ports and first and second output ports, the first input port of the second polarization beam splitter being connected to the output port of the first polarization converter, the second input port of the second polarization beam splitter being connected to the output port of the second polarization converter, the first input port and the first output port of the second polarization beam splitter being coupled by the second polarization plane, the first input port and the second output port of the second polarization beam splitter being coupled by the first polarization plane, the second input port and the first output port of the second polarization beam splitter being coupled by the first polarization plane, the second input port and the second output port of the second polarization beam splitter being coupled by the second polarization plane; a third polarization beam splitter having first and second input ports and first and second output ports, the first input port of the third polarization beam splitter being connected to the second output port of the second polarization beam splitter, the second input port of the third polarization beam splitter being connected to the first output port of the second polarization beam splitter, the first input port and the first output port of the third polarization beam splitter being coupled by the first polarization plane, the input port and the second output port of the third polarization beam splitter being coupled by the second polarization plane, the second input port and the first output port of the third polarization beam splitter being coupled by the second polarization plane, the second input port and the second output port of the third polarization beam splitter being coupled by the first polarization plane; a third polarization converter having an input port and an output port, the input port of the third polarization converter being connected to the first output port of the third polarization beam splitter, the third polarization converter converting the second polarization plane into the first polarization plane concerning light having a second wavelength having a predetermined relation to the first wavelength; a fourth polarization converter having an input port and an output port, the input port of the fourth polarization converter being connected to the second output port of the third polarization beam splitter, the fourth polarization converter converting the first polarization plane into the second polarization plane concerning light having the second wavelength; a fourth polarization beam splitter having first and second input ports and an output port, the first input port of the fourth polarization beam splitter being connected to the output port of the third polarization converter, the second input port of the fourth polarization beam splitter being connected to the output port of the fourth polarization converter, the first input port and the output port of the fourth polarization beam splitter being coupled by the first polarization plane, the second input port and the output port of the fourth polarization beam splitter being coupled by the second polarization plane; each of the first to fourth polarization converters having an optical waveguide structure over which a surface acoustic wave propagates; the propagation directions of the light and the surface acoustic wave in each of the first and fourth polarization converters being opposite to each other; the propagation directions of the light and the surface acoustic wave in each of the second and third polarization converters being identical with each other.

In accordance with a still further aspect of the present invention, there is provided a device for wavelength conversion, comprising a plurality of units cascaded; each of the units comprising a first polarization beam splitter having first and second input ports and first and second output ports, the first input port and the first output port of the first polarization beam splitter being coupled by a first polarization plane, the first input port and the second output port of the first polarization beam splitter being coupled by a second polarization plane perpendicular to the first polarization plane, the second input port and the first output port of the first polarization beam splitter being coupled by the second polarization plane, the second input port and the second output port of the first polarization beam splitter being coupled by the first polarization plane; a first polarization converter having an input port and an output port, the input port of the first polarization converter being connected to the first output port of the first polarization beam splitter, the first polarization converter converting the first polarization plane into the second polarization plane concerning light having a predetermined wavelength; a second polarization converter having an input port and an output port, the input port of the second polarization converter being connected to the second output port of the first polarization beam splitter, the second polarization converter converting the second polarization plane into the first polarization plane concerning light having the predetermined wavelength; and a second polarization beam splitter having first and second input ports and first and second output ports, the first input port of the second polarization beam splitter being connected to the output port of the first polarization converter, the second input port of the second polarization beam splitter being connected to the output port of the second polarization converter, the first input port and the first output port of the second polarization beam splitter being coupled by the second polarization plane, the first input port and the second output port of the second polarization beam splitter being coupled by the first polarization plane, the second input port and the first output port of the second polarization beam splitter being coupled by the first polarization plane, the second input port and the second output port of the second polarization beam splitter being coupled by the second polarization plane; each of the first and second polarization converters having an optical waveguide structure over which a surface acoustic wave propagates; the propagation directions of the light and the surface acoustic wave in one of the first and second polarization converters being opposite to each other; the propagation directions of the light and the surface acoustic wave in the other of the first and second polarization converters being identical with each other.

In accordance with a still further aspect of the present invention, there is provided a device for wavelength conversion, comprising a plurality of units arranged in a matrix; each of the units comprising a first polarization beam splitter having first and second input ports and first and second output ports, the first input port and the first output port of the first polarization beam splitter being coupled by a first polarization plane, the first input port and the second output port of the first polarization beam splitter being coupled by a second polarization plane perpendicular to the first polarization plane, the second input port and the first output port of the first polarization beam splitter being coupled by the second polarization plane, the second input port and the second output port of the first polarization beam splitter being coupled by the first polarization plane; a first polarization converter having an input port and an output port, the input port of the first polarization converter being connected to the first output port of the first polarization beam splitter, the first polarization converter converting the first polarization plane into the second polarization plane concerning light having a predetermined wavelength; a second polarization converter having an input port and an output port, the input port of the second polarization converter being connected to the second output port of the first polarization beam splitter, the second polarization converter converting the second polarization plane into the first polarization plane concerning light having the predetermined wavelength; and a second polarization beam splitter having first and second input ports and first and second output ports, the first input port of the second polarization beam splitter being connected to the output port of the first polarization converter, the second input port of the second polarization beam splitter being connected to the output port of the second polarization converter, the first input port and the first output port of the second polarization beam splitter being coupled by the second polarization plane, the first input port and the second output port of the second polarization beam splitter being coupled by the first polarization plane, the second input port and the first output port of the second polarization beam splitter being coupled by the first polarization plane, the second input port and the second output port of the second polarization beam splitter being coupled by the second polarization plane; each of the first and second polarization converters having an optical waveguide structure over which a surface acoustic wave propagates; the propagation directions of the light and the surface acoustic wave in one of the first and second polarization converters being opposite to each other; the propagation directions of the light and the surface acoustic wave in the other of the first and second polarization converters being identical with each other.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIGS. 7A, 7B, and 7C are diagrams for illustrating the configuration and operation of a basic cell;

FIG. 10 is a block diagram showing a seventh preferred embodiment of the wavelength converter according to the present invention;

DETAILED DESCRIPTION OF THE PREFERRED EMBODIMENTS

Some preferred embodiments of the present invention will now be described in detail with reference to the attached drawings.

Figure 1:
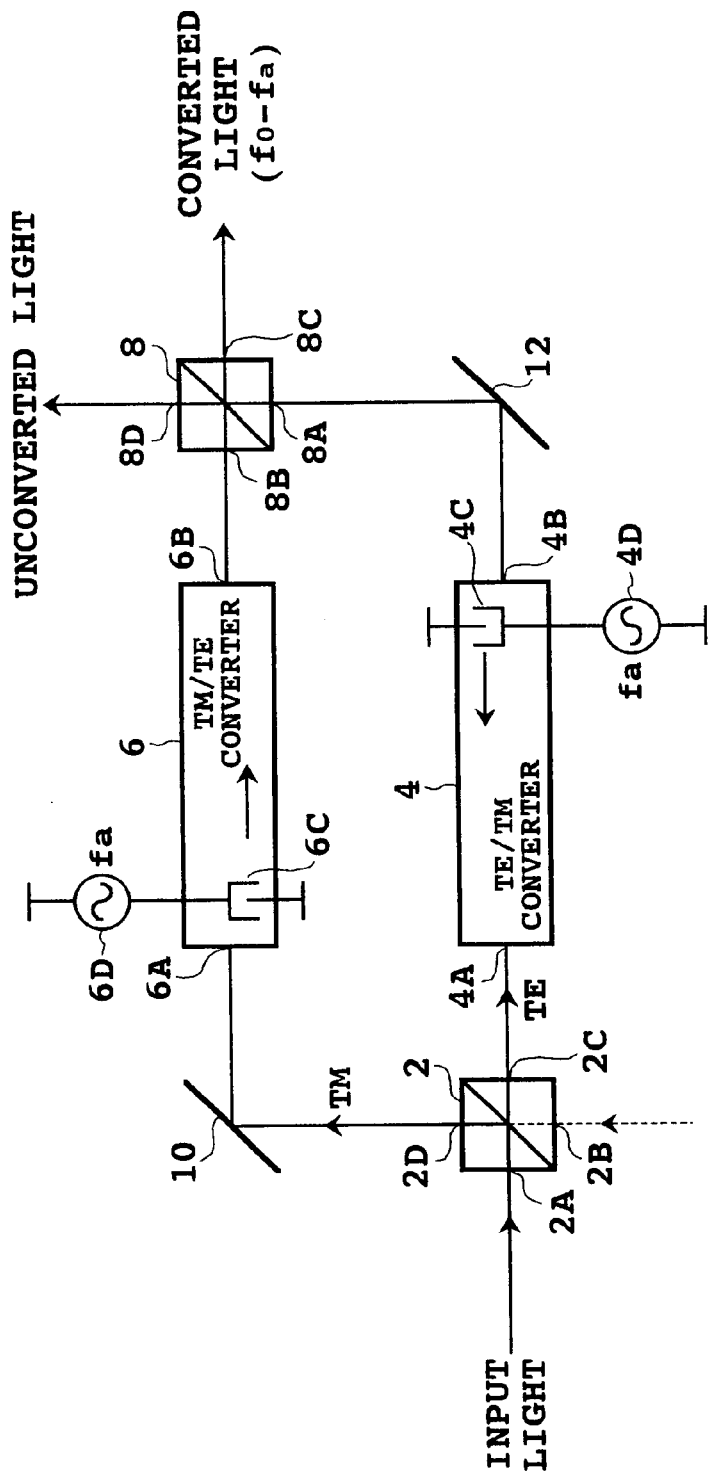
FIG. 1 is a block diagram showing a first preferred embodiment of the wavelength converter according to the present invention.

FIG. 1 is a block diagram showing a first preferred embodiment of the wavelength converter (the device for wavelength conversion) according to the present invention. This wavelength converter has a first polarization beam splitter 2, a TE/TM converter 4, a TM/TE converter 6, and a second polarization beam splitter 8.

The first polarization beam splitter 2 has input ports 2A and 2B and output ports 2C and 2D. The input port 2A and the output port 2C are coupled by a TE polarization plane parallel to the plane of the sheet of FIG. 1. The input port 2A and the output port 2D are coupled by a TM polarization plane perpendicular to the plane of the sheet of FIG. 1. The input port 2B and the output port 2C are coupled by the TM polarization plane. The input port 2B and the output port 2D are coupled by the TE polarization plane. It should be noted that the symbols of "TE" and "TM" are used only to specify a polarization plane, and that they are not bound by their electromagnetic definitions.

The TE/TM converter 4 has an input port 4A and an output port 4B. The input port 4A is connected to the output port 2C of the polarization beam splitter 2. The converter 4 has an optical waveguide structure extending from the input port 4A to the output port 4B, and is provided with an interdigital transducer (IDT) 4C in the vicinity of the output port 4B, so as to induce a surface acoustic wave (SAW) over this optical waveguide structure. The IDT 4C is supplied with a signal having a frequency fa from an oscillator 4D. The converter 4 functions to convert the TE polarization plane into the TM polarization plane concerning light having a wavelength determined by the frequency fa.

The TM/TE converter 6 has an input port 6A and an output port 6B. The input port 6A is connected through a mirror 10 to the output port 2D of the polarization beam splitter 2. The converter 6 has an optical waveguide structure extending from the input port 6A to the output port 6B, and is provided with an IDT 6C in the vicinity of the input port 6A, so as to induce a SAW over this optical waveguide structure. The IDT 6C is supplied with a signal having the frequency fa from an oscillator 6D. The converter 6 functions to convert the TM polarization plane into the TE polarization plane concerning light having the wavelength determined by the frequency fa.

The second polarization beam splitter 8 has input ports 8A and 8B and output ports 8C and 8D. The input port 8A and the output port 8C are coupled by the TM polarization plane. The input port 8A and the output port 8D are coupled by the TE polarization plane. The input port 8B and the output port 8C are coupled by the TE polarization plane. The input port 8B and the output port 8D are coupled by the TM polarization plane. The input port 8A is connected through a mirror 12 to the output port 4B of the TE/TM converter 4, and the input port 8B is connected to the output port 6B of the TM/TE converter 6.

A basic operation of this wavelength converter will now be described. It is assumed that WDM signal light obtained by wavelength division multiplexing a plurality of optical signals having different wavelengths is supplied as input light to the input port 2A of the first polarization beam splitter 2. The WDM signal light is separated into a TE component having the TE polarization plane and a TM component having the TM polarization plane by the polarization beam splitter 2.

The TE component is supplied to the TE/TM converter 4. The converter 4 converts the TE polarization plane of only the optical signal having the specific wavelength determined by the frequency fa, into the TM polarization plane, and outputs this optical signal having the TM polarization plane as converted light. Accordingly, when this converted light having the TM polarization plane is supplied through the mirror 12 to the second polarization beam splitter 8, this converted light is output from the output port 8C. The other optical signals having wavelengths other than the specific wavelength remain their TE polarization planes, and are output as unconverted light from the output port 8D of the polarization beam splitter 8.

The TM component from the first polarization beam splitter 2 is supplied through the mirror 10 to the TM/TE converter 6. The converter 6 converts the TM polarization plane of only the optical signal having the specific wavelength determined by the frequency fa, into the TE polarization plane, and outputs this optical signal having the TE polarization plane as converted light. This converted light having the TE polarization plane is then output from the output port 8C of the polarization beam splitter 8 in combination with the converted light having the TM polarization plane. The other optical signals having wavelengths other than the specific wavelength remain their TM polarization planes, and are output as unconverted light from the output port 8D of the polarization beam splitter 8 in combination with the unconverted light having the TE polarization plane.

An arbitrary wavelength channel can be selected by changing the frequency fa, so that the basic operation of the wavelength converter shown in FIG. 1 corresponds to the operation of an AOTF (Acousto-Optic Tunable Filter). It is known that an AOTF exhibits a phenomenon that the wavelength of a selected optical signal shifts by the frequency (fa) of an RF signal applied to each converter (Doppler shift by a lightwave and an acoustic wave) (Davis A. Smith et al., "Integrated-Optical Acoustically-Tunable Filters for WDM Networks", IEEE Journal on selected Areas in comm., vol.8, No.6, August 1980, pp1151–1159). The present invention utilizes this frequency (wavelength) shift to obtain the wavelength converter.

The direction of the frequency shift is determined by the kind of the converter and by whether or not the propagation direction of the light is the same as the propagation direction of the SAW. More specifically, in a TE/TM converter and in the case that the propagation direction of the light is the same as that of the SAW, the frequency shift is +fa, whereas in the case that the propagation direction of the light is opposite to that of the SAW, the frequency shift is –fa. In a TM/TE converter and in the case that the propagation direction of the light is the same as that of the SAW, the frequency shift is –fa, whereas in the case that the propagation direction of the light is opposite to that of the SAW, the frequency shift is +fa.

To make the direction of the frequency shift in the TE/TM converter 4 identical with the direction of the frequency shift in the TM/TE converter 6 in the first preferred embodiment shown in FIG. 1, the IDT 4C is provided in the vicinity of the output port 4B of the TE/TM converter 4 to thereby make the propagation directions of the light and the SAW opposite to each other, and the IDT 6C is provided in the vicinity of the input port 6A of the TM/TE converter 6 to thereby make the propagation directions of the light and the SAW identical with each other.

Accordingly, letting fo denote a frequency corresponding to the selected specific wavelength, the frequency of the converted light output from the output port 8C of the polarization beam splitter 8 becomes fo–fa.

The converted light thus obtained by wavelength conversion is output from the output port 8C of the polarization beam splitter 8 entirely in principle, so that a high conversion efficiency in wavelength conversion can be obtained. Further, it is not necessary to provide a light source or the like for the control light required for wavelength conversion as in the case of carrying out the conventional method, so that the configuration of the wavelength converter can be simplified.

While the polarization beam splitters 2 and 8 and the converters 4 and 6 are shown as individual components in FIG. 1, these components may be formed integrally on a lithium niobate substrate or the like as shown in the above-cited literature, for example.

In the wavelength converter shown in FIG. 1, the input light may be supplied to the input port 2B of the polarization beam splitter 2. In this case, the converted light is output from the output port 8D of the polarization beam splitter 8, and the unconverted light is output from the output port 8C of the polarization beam splitter 8. Further, the direction of the frequency shift in the converted light is opposite to that in the wavelength converter shown in FIG. 1. In the case that the input light is supplied to the input port 2B of the polarization beam splitter 2, the TE/TM converter 4 functions as a TM/TE converter, and the TM/TE converter 6 functions as a TE/TM converter.

Figure 2:
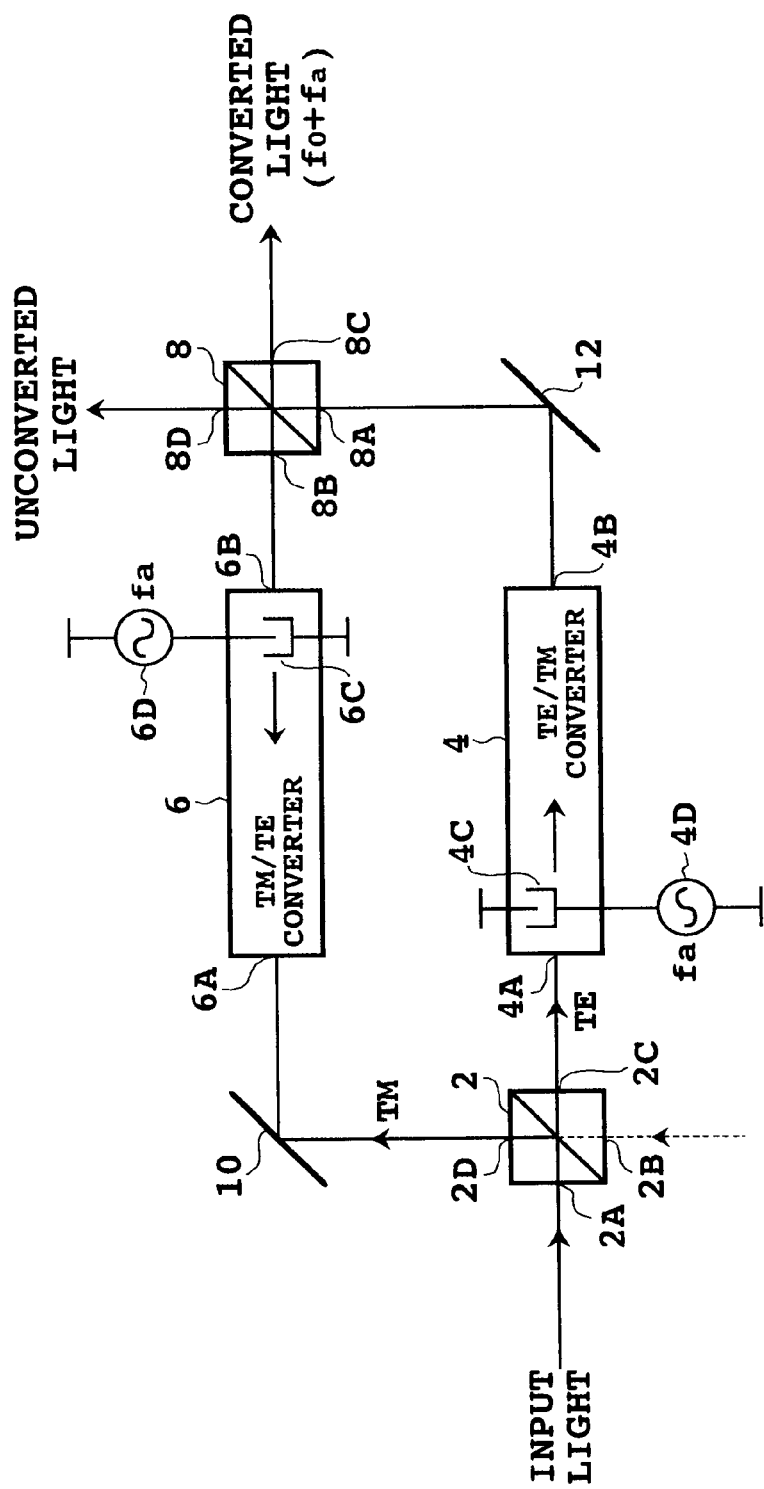
FIG. 2 is a block diagram showing a second preferred embodiment of the wavelength converter according to the present invention.

FIG. 2 is a block diagram showing a second preferred embodiment of the wavelength converter according to the present invention. In this preferred embodiment, the propagation direction of the SAW in each of the converters 4 and 6 is opposite to that in the first preferred embodiment shown in FIG. 1. To this end, the IDT 4C in the TE/TM converter 4 is provided in the vicinity of the input port 4A, so as to make the propagation directions of the light and the SAW identical with each other. Further, the IDT 6C in the TM/TE converter 6 is provided in the vicinity of the output port 6B, so as to make the propagation directions of the light and the SAW opposite to each other. As a result, the direction of the frequency shift becomes opposite to that in the first preferred embodiment on the above-mentioned principle, that is, the frequency of the converted light becomes fo+fa.

Figure 3:
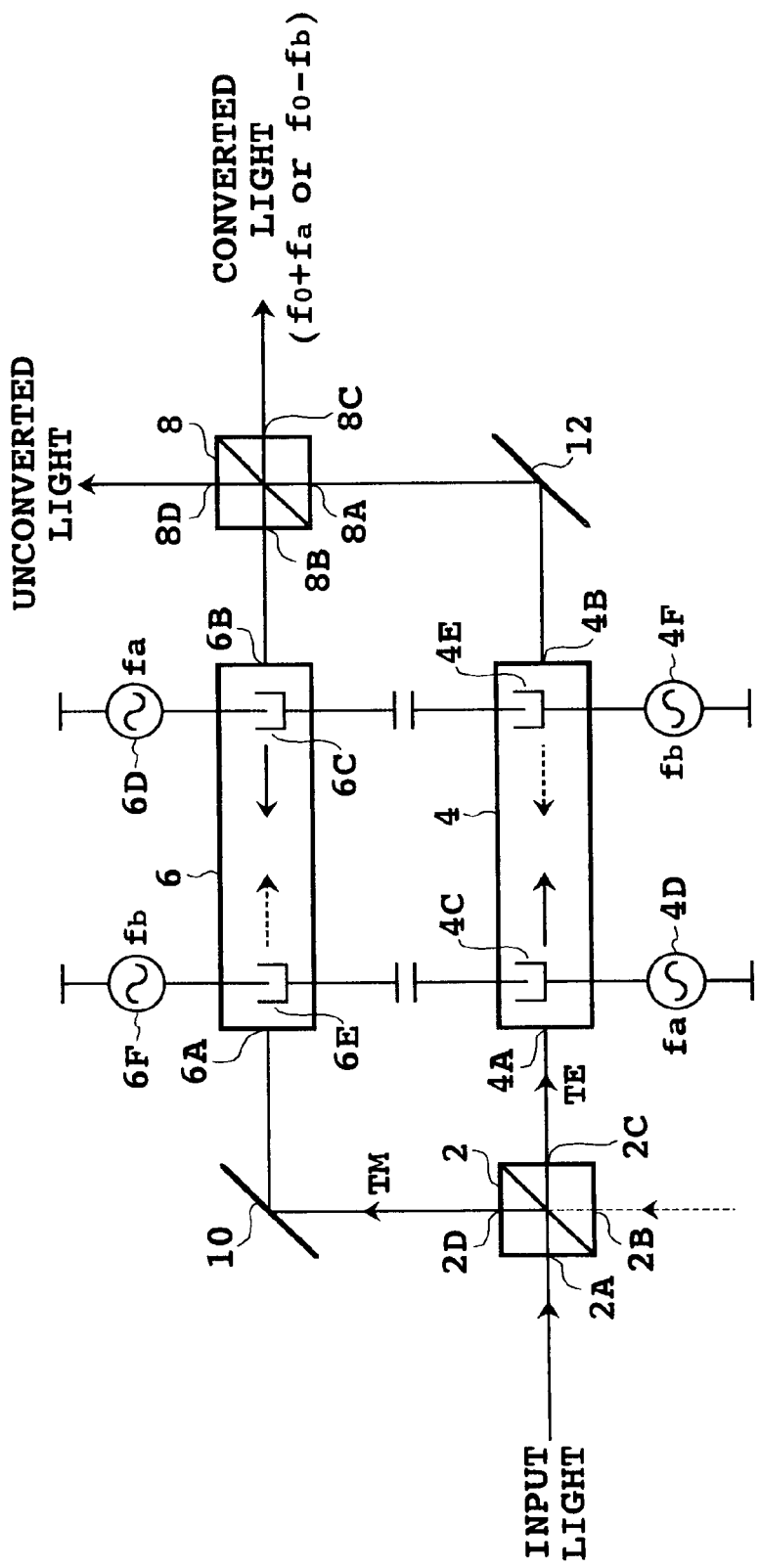
FIG. 3 is a block diagram showing a third preferred embodiment of the wavelength converter according to the present invention.

FIG. 3 is a block diagram showing a third preferred embodiment of the wavelength converter according to the present invention. This preferred embodiment is configured by combining the first preferred embodiment shown in FIG. 1 and the second preferred embodiment shown in FIG. 2 to thereby enable electrical switching of the direction of the frequency shift from the input light to the converted light.

More specifically, in contrast with the second preferred embodiment shown in FIG. 2, an IDT 4E is additionally provided in the vicinity of the output port 4B of the TE/TM converter 4, and an IDT 6E is additionally provided in the vicinity of the input port 6A of the TM/TE converter 6. The IDT 4E is supplied with a signal having a frequency fb from an oscillator 4F, and the IDT 6E is supplied with a signal having the frequency fb from an oscillator 6F. Accordingly, by switching between the operation of the oscillators 4D and 6D and the operation of the oscillators 4F and 6F, the frequency shift from the input light to the converted light can be switched. In the case that the operation of the oscillators 4D and 6D is selected, the propagation directions of the light and the SAW in the TE/TM converter 4 are identical with each other, and the propagation directions of the light and the SAW in the TM/TE converter 6 are opposite to each other, so that the frequency of the converted light becomes fo+fa. In the case that the operation of the oscillators 4F and 6F is selected, the propagation directions of the light and the SAW in the TE/TM converter 4 are opposite to each other, and the propagation directions of the light and the SAW in the TM/TE converter 6 are identical with each other, so that the frequency of the converted light becomes fo−fb.

In this manner, by selectively operating the four oscillators 4D, 4F, 6D, and 6F, the direction of the frequency shift from the input light to the converted light can be switched. In particular, by setting the frequencies fa and fb different from each other, the quantity of the frequency shift can also be changed.

The frequency shift quantity will now be considered. For example, in the first preferred embodiment shown in FIG. 1, the frequency shift quantity is identical with the frequency fa itself of the signal applied to each of the converters 4 and 6 to select (determine) a specific wavelength $\lambda c$ in WDM signal light. Accordingly, the frequency fa is uniquely determined by the specific wavelength $\lambda c$. The relation between the frequency fa and the specific wavelength $\lambda c$ satisfies the following expression.

fa=Va·$\Delta$n/$\lambda c$ where Va is the velocity of the SAW, and $\Delta$n is the difference in refractive index between ordinary ray and extraordinary ray in the optical waveguide structure in each of the converters 4 and 6.

This relation shows that the frequency shift quantity cannot be changed independently of the selected specific wavelength. However, independent changing of the frequency shift quantity can be effected by using the wavelength converter shown in FIG. 1 as a basic cell and designing a multistage connection of such basic cells. In this case, the frequency shift quantity becomes variable not continuously, but stepwise depending on the number of stages of the multistage connection. In a system adopting WDM, the wavelength spacing of WDM signal light is predetermined as a worldwide standard by the ITU, for example. Accordingly, by setting the number of stages of the multistage connection so that the standardized wavelength spacing is obtained, there arises no problem in practical use.

Figure 4:
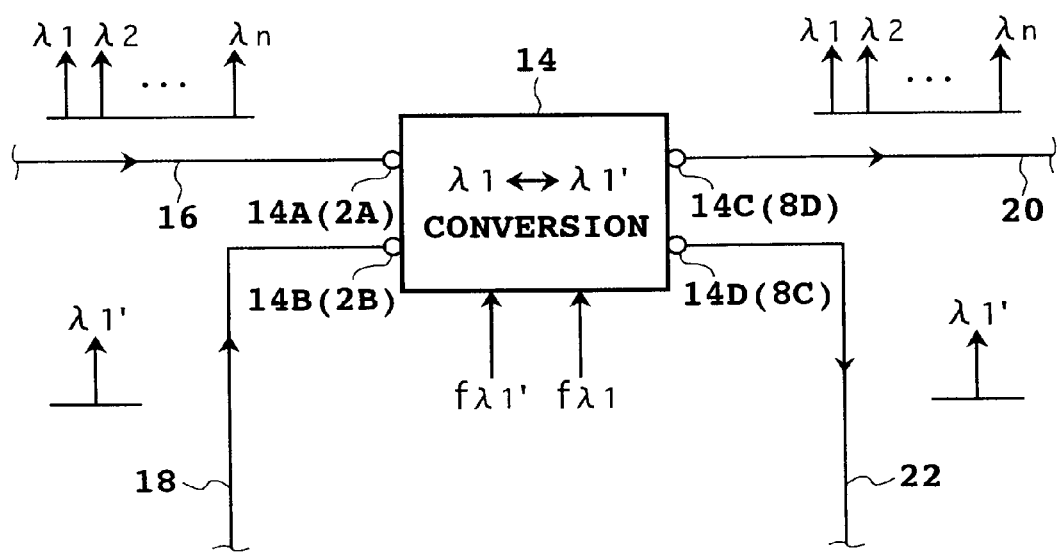
FIG. 4 is a block diagram showing a first preferred embodiment of the system according to the present invention.

FIG. 4 is a block diagram showing a first preferred embodiment of the system according to the present invention. This system includes an optical add/drop multiplexer 14 having input ports 14A and 14B and output ports 14C and 14D, and optical fiber transmission lines 16, 18, 20, and 22 respectively connected to the ports 14A, 14B, 14C, and 14D. The optical add/drop multiplexer 14 may be provided by the wavelength converter according to the present invention, specifically by the wavelength converter shown in each of FIGS. 1 to 3. The input ports 14A and 14B respectively correspond to the input ports 2A and 2B of the polarization beam splitter 2, and the output ports 14C and 14D respectively correspond to the output ports 8D and 8C of the polarization beam splitter 8. The optical fiber transmission line 16 is connected to a first optical fiber network (not shown). The optical fiber transmission line 18 is connected to a terminal device for adding (not shown). The optical fiber transmission line 20 is connected to a second optical fiber network (not shown). The optical fiber transmission line 22 is connected to a terminal device for dropping (not shown).

WDM signal light obtained by wavelength division multiplexing a plurality of optical signals having wavelengths $\lambda 1$ to $\lambda n$ is supplied from the first optical fiber network through the optical fiber transmission line 16 to the input port 14A. Assuming that a specific wavelength to be selected is $\lambda 1$, the frequency of a SAW to be used in the multiplexer 14 is set to f$\lambda 1$, so that the optical signal having the wavelength $\lambda 1$ undergoes frequency shift to become a converted signal having a wavelength $\lambda 1'$, which is then dropped from the output port 14D into the optical fiber transmission line 22.

An optical signal having a wavelength $\lambda 1'$ for adding is supplied from the optical fiber transmission line 18 to the port 14B. The frequency of the SAW is set to f$\lambda 1'$ so that the wavelength $\lambda 1'$ of the optical signal for adding is converted into the original wavelength $\lambda 1$. As a result, the optical signal having the wavelength $\lambda 1'$ for adding undergoes frequency shift to become a converted signal having a wavelength $\lambda 1$, which is then added from the port 14C into the optical fiber transmission line 20.

The wavelength $\lambda 1$ of the optical signal added is slightly different from the original wavelength $\lambda 1$. However, the difference corresponds to $\Delta \lambda / \lambda$, which is very small, and there is no problem in practical use.

According to the system shown in FIG. 4, the wavelength converter according to the present invention is used as an optical add/drop multiplexer, so that the wavelength conversion (frequency shift) of an optical signal can be performed simultaneously with adding and dropping of an optical signal.

In the above preferred embodiment, the wavelength converter according to the present invention can be regarded as a four-port type optical device having combined functions of wavelength conversion and adding/dropping of an optical signal. By inserting the wavelength converter according to the present invention into a system as shown in FIG. 4, a flexible network can be constructed without expanding a hardware scale.

Figure 5:
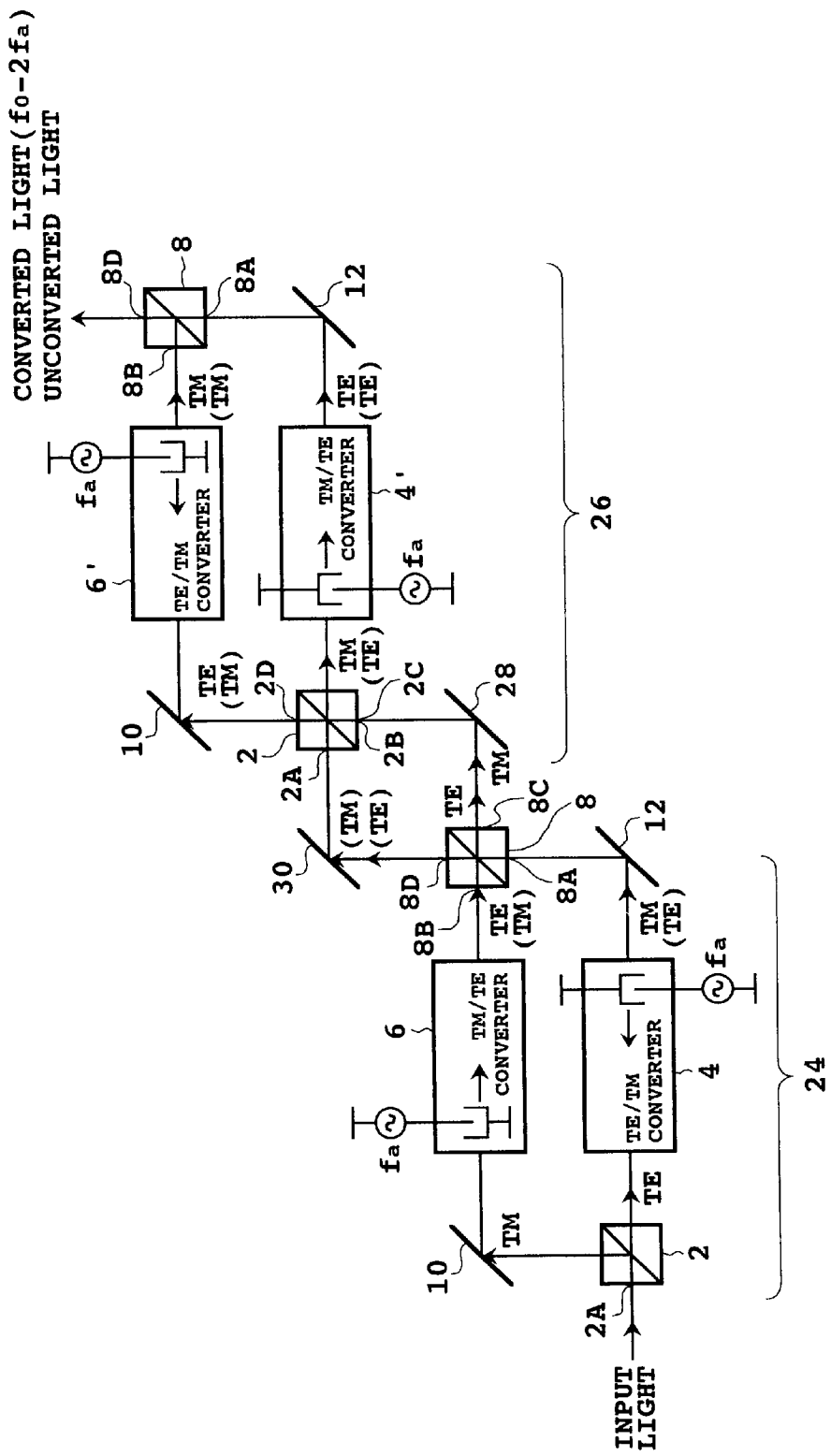
FIG. 5 is a block diagram showing a fourth preferred embodiment of the wavelength converter according to the present invention.

FIG. 5 is a block diagram showing a fourth preferred embodiment of the wavelength converter according to the present invention. This wavelength converter is configured by cascading a wavelength converter 24 according to the first preferred embodiment shown in FIG. 1 and a wavelength converter 26 according to the second preferred embodiment shown in FIG. 2 through mirrors 28 and 30. The mirror 28 is provided to connect the output port 8C of the second polarization beam splitter 8 in the wavelength converter 24 to the input port 2B of the first polarization beam splitter 2 in the wavelength converter 26. The mirror 30 is provided to connect the output port 8D of the second polarization beam splitter 8 in the wavelength converter 24 to the input port 2A of the first polarization beam splitter 2 in the wavelength converter 26. In this preferred embodiment, the input port 2B (see FIG. 1) of the first polarization beam splitter 2 in the wavelength converter 24 is not used, and the output port 8C (see FIG. 2) of the second polarization beam splitter 8 in the wavelength converter 26 is not used.

When WDM signal light is supplied as input light to the input port 2A of the first polarization beam splitter 2 in the wavelength converter 24, an optical signal having a specific wavelength in the WDM signal light undergoes wavelength conversion and is finally output as converted light from the output port 8D of the second polarization beam splitter 8 in the wavelength converter 26. The frequency of the converted light is fo−2fa. Further, the other optical signals having wavelengths other than the specific wavelength are also output from the port 8D together with the converted light.

In FIG. 5, the polarization state of the optical signal having the specific wavelength is represented by TE or TM on each optical path, and the polarization state of the other optical signals having wavelengths other than the specific wavelength is represented by (TE) or (TM) on each optical path.

According to the fourth preferred embodiment shown in FIG. 5, when the WDM signal light as the input light is supplied to the input port 2A of the polarization beam splitter 2 in the first-stage wavelength converter 24, both the wavelength-converted optical signal (the converted light) and the remaining wavelength-unconverted optical signals (the unconverted light) are output from the output port 8D of the polarization beam splitter 8 in the second-stage wavelength converter 26. Accordingly, it is possible to provide a one-input one-output type wavelength converting device. A system using this principle will now be described.

Figure 6:
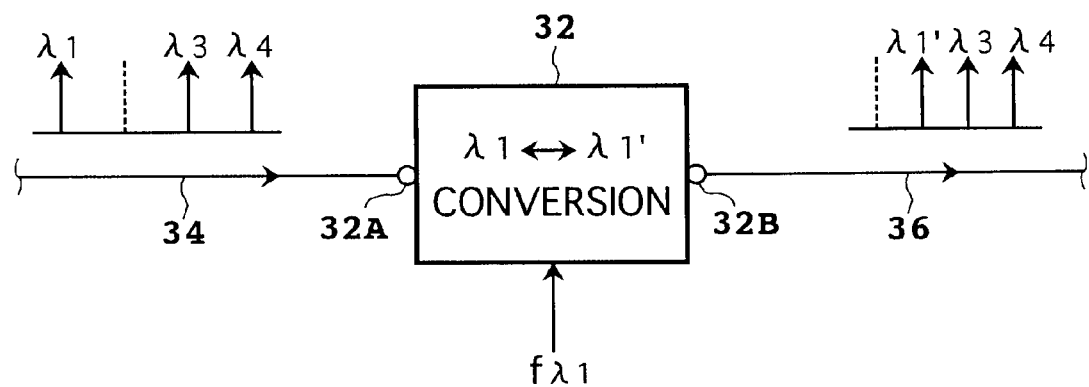
FIG. 6 is a block diagram showing a second preferred embodiment of the system according to the present invention.

FIG. 6 is a block diagram showing a second preferred embodiment of the system according to the present invention. This system includes a one-input one-output type wavelength converting device 32 having an input port 32A and an output port 32B, and optical fiber transmission lines 34 and 36 respectively connected to the ports 32A and 32B. The device 32 may be provided by the wavelength converter according to the fourth preferred embodiment shown in FIG. 5, for example. In this case, the input port 32A corresponds to the input port 2A of the polarization beam splitter 2 in the first-stage wavelength converter 24, and the output port 32B corresponds to the output port 8D of the polarization beam splitter 8 in the second-stage wavelength converter 26. Each of the optical fiber transmission lines 34 and 36 is connected to an optical fiber network (not shown).

It is now assumed that WDM signal light obtained by wavelength division multiplexing a plurality of optical signals having wavelengths λ1, λ3, and λ4 is supplied from the optical fiber transmission line 34 to the port 32A. The frequency of a SAW in the device 32 is set to f λ1, so that the optical signal having the wavelength λ1 undergoes wavelength conversion to become a converted signal having a wavelength λ1'. This wavelength-converted optical signal and the remaining wavelength-unconverted signals (λ3 and λ4) are output from the common port 32B into the optical fiber transmission line 36. Thus, the device 32 in this preferred embodiment is suitable for connection of two optical fiber networks each adopting WDM. The wavelength conversion operation in this preferred embodiment is reversible between the ports 32A and 32B.

FIGS. 7A, 7B, and 7C are diagrams for illustrating the configuration and operation of a basic cell to be used in the following preferred embodiments. FIG. 7A shows a unit 38 as the basic cell having a configuration similar to that of the optical add/drop multiplexer 14 shown in FIG. 4. The cell 38 may be provided by the wavelength converter shown in each of FIGS. 1 to 3. FIG. 7C shows different operating conditions of the cell 38. As shown in FIG. 7C, wavelength conversion is not carried out in a bar condition; wavelength conversion by the frequency shift of −fa is carried out in a falling cross condition; and wavelength conversion by the frequency shift of +fa is carried out in a rising cross condition.

FIG. 7B shows a basic cell 40 configured by cascading two cells 38 each shown in FIG. 7A. The cell 40 may be provided by the wavelength converter shown in FIG. 5, for example. In this case, a through output and a drop output are obtained at the same port as previously mentioned.

Figure 8:
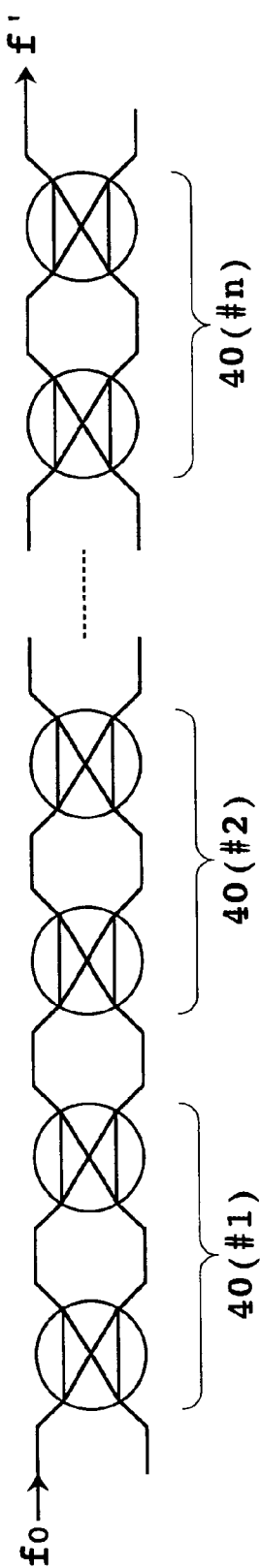
FIG. 8 is a block diagram showing a fifth preferred embodiment of the wavelength converter according to the present invention.

FIG. 8 is a block diagram showing a fifth preferred embodiment of the wavelength converter according to the present invention. This wavelength converter is configured by cascading n cells 40(#1) to 40(#n) each corresponding to the basic cell 40 shown in FIG. 7B. Letting fo denote the frequency of an optical signal having a specific wavelength to be supplied to the cell 40(#1) and f' denote the frequency of converted light to be output from the cell 40(#n), f'=fo±2nfa. In such a wavelength converter having a multi-stage cell configuration, the frequency shift quantity can be arbitrarily set stepwise according to the above-mentioned expression.

Figure 9:
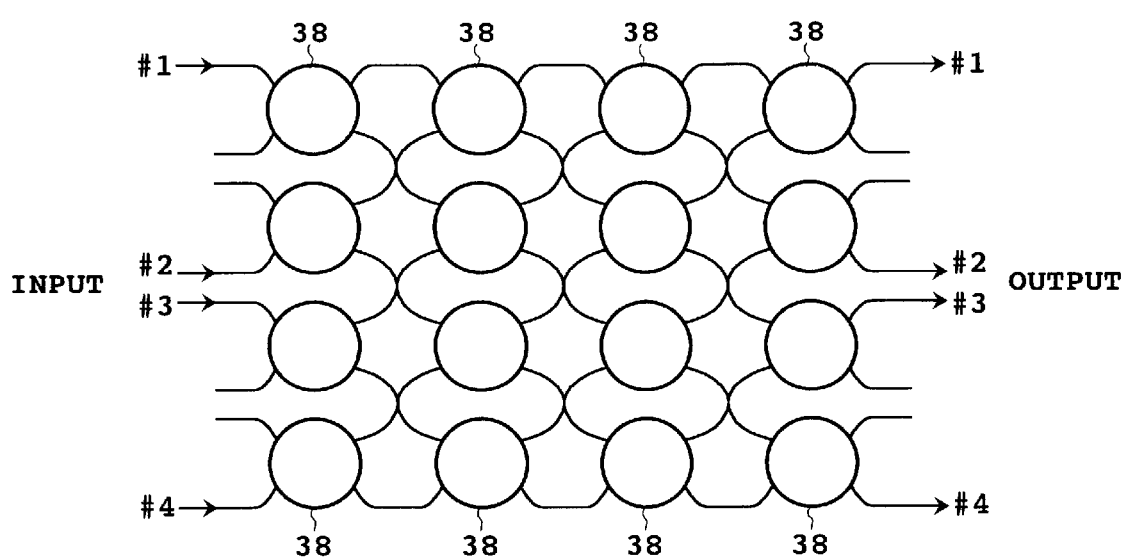
FIG. 9 is a block diagram showing a sixth preferred embodiment of the wavelength converter according to the present invention.

FIG. 9 is a block diagram showing a sixth preferred embodiment of the wavelength converter according to the present invention. This wavelength converter is configured by arranging a plurality of cells 38 each shown in FIG. 7A in a 4×4 matrix between four input ports #1 to #4 and four output ports #1 to #4 in such a manner that the number of the cells 38 providing an optical path extending from one input port to one output port becomes constant (four in this preferred embodiment). The direction of the frequency shift in each cell 38 is −fa in the falling cross condition or +fa in the rising cross condition as shown in FIG. 7C. With this configuration, both the function of a 4×4 optical switch and the function of wavelength conversion according to the present invention can be obtained.

TABLE 1

|       |    | Output |      |      |      |
|-------|----|--------|------|------|------|
|       |    | #1     | #2   | #3   | #4   |
| Input | #1 | 0      | −2fa | −2fa | −4fa |
|       | #2 | +2fa   | 0    | 0    | −2fa |
|       | #3 | +2fa   | 0    | 0    | −2fa |
|       | #4 | +4fa   | +2fa | +2fa | 0    |

Table 1 shows a frequency shift quantity in the optical path extending from each input port to each output port in the preferred embodiment shown in FIG. 9. As apparent from Table 1, the frequency shift quantity in the optical path from the input port #2 to the output port #1 is equal to that in the optical path from the input port #3 to the output port #1, as indicated by +2fa. Further, the frequency shift quantity in the optical path from the input port #2 to the output port #4 is equal to that in the optical path from the input port #3 to the output port #4, as indicated by −2fa. Such equality in the frequency shift quantity may cause inconvenience in practical use. Some preferred embodiments intended to cope with this possibility will now be described with reference to FIGS. 10 and 11.

FIG. 10 is a block diagram showing a seventh preferred embodiment of the wavelength converter according to the present invention. In contrast with the sixth preferred embodiment shown in FIG. 9, the wavelength converter shown in FIG. 10 is provided with a frequency shift adjusting stage 42 for each of the output ports #1 to #4. The frequency shift adjusting stage 42 is provided by the basic cell 40 shown in FIG. 7B, for example. The adjusting stage 42 for the output port #1 is configured by cascading a cell 38 providing a frequency shift of +fa in the falling cross condition and a cell 38 providing a frequency shift of +fa in the rising cross condition. The adjusting stage 42 for the output port #2 is configured by cascading a cell 38 providing a frequency shift of +fa in the rising cross condition and a cell 38 providing a frequency shift of +fa in the falling cross condition. The adjusting stage 42 for the output port #3 is configured by cascading a cell 38 providing a frequency shift of −fa in the falling cross condition and a cell 38 providing a frequency shift of −fa in the rising cross condition. The adjusting stage 42 for the output port #4 is configured by cascading a cell 38 providing a frequency shift of −fa in the rising cross condition and a cell 38 providing a frequency shift of −fa in the falling cross condition.

TABLE 2

|       |    | Output |      |      |      |
|-------|----|--------|------|------|------|
|       |    | #1     | #2   | #3   | #4   |
| Input | #1 | 0      | −2fa | −4fa | −6fa |
|       | #2 | +2fa   | 0    | −2fa | −4fa |
|       | #3 | +4fa   | +2fa | 0    | −2fa |
|       | #4 | +6fa   | +4fa | +2fa | 0    |

Table 2 shows a frequency shift quantity in an optical path between each input port and each output port in the preferred embodiment shown in FIG. 10. As apparent from Table 2, the frequency shift quantities between each output port and all the input ports are different from each other, thereby obtaining convenience in practical use.

Figure 11:
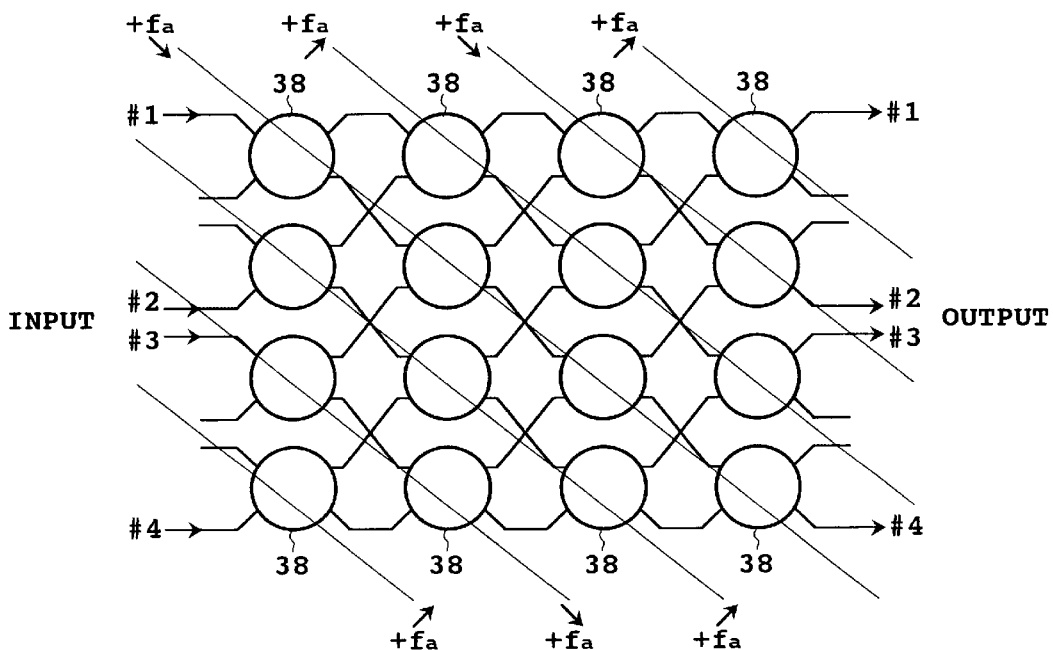
FIG. 11 is a block diagram showing an eighth preferred embodiment of the wavelength converter according to the present invention.

FIG. 11 is a block diagram showing an eighth preferred embodiment of the wavelength converter according to the present invention. In contrast with the preferred embodiment shown in FIG. 9 wherein each cell 38 provides a frequency shift quantity of +fa in the rising cross condition as shown in FIG. 7C, the preferred embodiment shown in FIG. 11 is characterized in that a cell 38 providing a frequency shift quantity of +fa in the rising cross condition and a cell 38 providing a frequency shift quantity of +fa in the falling cross condition are alternately arranged on each line of the matrix.

TABLE 3

|       |    | Output |      |      |      |
|-------|----|--------|------|------|------|
|       |    | #1     | #2   | #3   | #4   |
| Input | #1 | 0      | +2fa | −2fa | +4fa |
|       | #2 | +2fa   | +4fa | 0    | −2fa |
|       | #3 | −2fa   | 0    | +4fa | +2fa |
|       | #4 | +4fa   | −2fa | +2fa | 0    |

Table 3 shows a frequency shift quantity in an optical path between each input port and each output port in the preferred embodiment shown in FIG. 11. Also in this preferred embodiment, the frequency shift quantities between each input port and all the output ports are different from each other, thereby obtaining convenience in practical use. Further, in contrast with the preferred embodiment shown in FIG. 10, the frequency shift adjusting stages 42 are not necessary, thereby simplifying the configuration of the wavelength converter.

Figure 12:
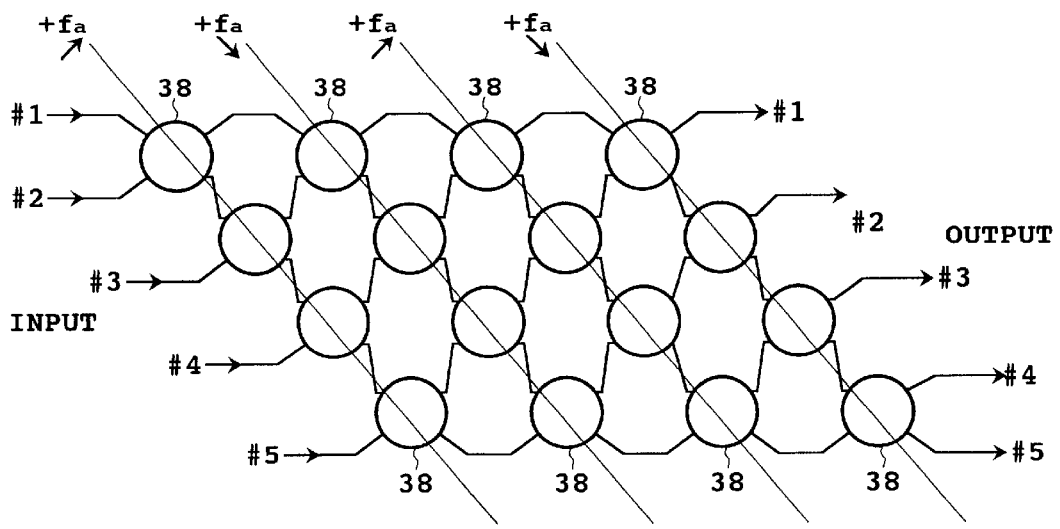
FIG. 12 is a block diagram showing a ninth preferred embodiment of the wavelength converter according to the present invention.

FIG. 12 is a block diagram showing a ninth preferred embodiment of the wavelength converter according to the present invention. In this preferred embodiment, sixteen cells 38 are arranged in a 4×4 matrix between five input ports #1 to #5 and five output ports #1 to #5 in such a manner that the cells 38 on each line of the matrix are horizontally shifted from the cells 38 on the previous line by an amount corresponding to the half of each cell 38. Further, as shown in FIG. 12, on each line of the matrix, the cell 38 providing a frequency shift quantity of +fa in the rising cross condition and the cell 38 providing a frequency shift quantity of +fa in the falling cross condition are alternately arranged.

Unlike the preferred embodiments shown in FIGS. 9 to 11, this preferred embodiment has no conversion function. However, various frequency shift quantities can be set without increasing the number of cells 38. More specifically, as shown in Table 4, various frequency shift quantities can be set in the optical path from each input port and its corresponding output port by switching on and off a SAW in each cell 38.

TABLE 4

| Input-Output Ports | Settable Shift Quantities |
|--------------------|---------------------------|
| #1 → #1            | 0, +2fa, —, −2fa, −4fa    |
| #2 → #2            | 0, +2fa, '4fa, −2fa, −4fa |
| #3 → #3            | 0, +2fa, '4fa, −2fa, −4fa |
| #4 → #4            | 0, +2fa, '4fa, −2fa, −4fa |
| #5 → #5            | 0, +2fa, '4fa, −2fa, —    |

The industrial applicability of the present invention will now be described. As mentioned above, the frequency shift quantity fa is uniquely determined by the specific wavelength λc. In the case that each of the converters 4 and 6 in the preferred embodiment shown in FIG. 1 is provided by an optical waveguide structure using a lithium niobate substrate, for example, Δn=0.07 and Va=3500 m/s. Therefore, assuming that the specific wavelength λc is 1547.72 nm identical with λ#16 defined in the ITU, the frequency shift quantity becomes 158.297 MHz. Accordingly, the refractive index difference Δn is smaller by about three orders of magnitude than that for performing a wavelength conversion of 100 GHz (0.8 nm) as the ITU grid. Accordingly, in the case of using lithium niobate, the present invention is limited to applications of minute wavelength conversion. However, the applications of minute wavelength conversion are numerous. For example, in a large-scale WDM network, it is proposed to always pass reference light as a wavelength reference through the network. In the case that this reference light undergoes wavelength shift by an AOTF or the like in an optical add/drop multiplexer, for example, the minute wavelength conversion can be utilized as an application for correction of this wavelength shift. Further, in the case that photonic switching is introduced in the future, an optical memory using an optical semiconductor device or the like will be used for the photonic switching, so that there is a possibility of wavelength shift also in this case, and the minute wavelength conversion can therefore be utilized. Further, in the case that the ITU grid becomes narrower (e.g., 1 GHz) in a WDM system, the minute wavelength conversion can be utilized for wavelength shift correction of a main signal.

While tens to hundreds of values as the refractive index difference Δn cannot be virtually realized by optical crystals practically used at present, it is possible to obtain a crystal having a required optical constant by using a photonic crystal technique. Accordingly, by carrying out the present invention with the photonic crystal technique, it is possible to perform wavelength conversion between WDM wavelength channels in a 1.55 μm band. Information on photonic crystals is described in "Fabrication of Three-Dimensional Photonic Crystals and Their Applications", IEICE Journal Vol.81, No.10, pp.1063–1066, October 1998, for example.

As described above, according to the present invention, it is possible to provide a method for wavelength conversion which can achieve a high efficiency of generation of converted light.

According to the present invention, it is possible to provide a device for wavelength conversion which can achieve a high efficiency of generation of converted light with a simple configuration.

According to the present invention, it is possible to provide a novel system including such a device.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A method for wavelength conversion, comprising the steps of:
    (a) separating an optical signal received into a first polarization component having a first polarization plane and a second polarization component having a second polarization plane perpendicular to said first polarization plane;
    (b) supplying said first polarization component to a first optical waveguide structure over which a first surface acoustic wave propagates, in a direction identical with the propagation direction of said first surface acoustic wave;
    (c) supplying said second polarization component to a second optical waveguide structure over which a second surface acoustic wave propagates, in a direction opposite to the propagation direction of said second surface acoustic wave; and
    (d) combining first converted light output from said first optical waveguide structure and second converted light output from said second optical waveguide structure.

2. A method according to claim 1, wherein said first and second converted lights have said second and first polarization planes, respectively.

3. A method according to claim 1, wherein:
    said first and second surface acoustic waves respectively propagating over said first and second optical waveguide structures have the same predetermined frequency; and
    said first and second converted lights are frequency-shifted from said optical signal by a quantity determined by said predetermined frequency.

4. A device for wavelength conversion, comprising:
    a first polarization beam splitter having a first input port and first and second output ports, said first input port and said first output port of said first polarization beam splitter being coupled by a first polarization plane, said first input port and said second output port of said first polarization beam splitter being coupled by a second polarization plane perpendicular to said first polarization plane;
    a first polarization converter having an input port and an output port, said input port of said first polarization converter being connected to said first output port of said first polarization beam splitter, said first polarization converter converting said first polarization plane into said second polarization plane concerning light having a predetermined wavelength;
    a second polarization converter having an input port and an output port, said input port of said second polarization converter being connected to said second output port of said first polarization beam splitter, said second polarization converter converting said second polarization plane into said first polarization plane concerning light having said predetermined wavelength; and
    a second polarization beam splitter having first and second input ports and a first output port, said first input port of said second polarization beam splitter being connected to said output port of said first polarization converter, said second input port of said second polarization beam splitter being connected to said output port of said second polarization converter, said first input port and said first output port of said second polarization beam splitter being coupled by said second polarization plane, said second input port and said first output port of said second polarization beam splitter being coupled by said first polarization plane;
    each of said first and second polarization converters having an optical waveguide structure over which a surface acoustic wave propagates;
    the propagation directions of said light and said surface acoustic wave in one of said first and second polarization converters being opposite to each other;
    the propagation directions of said light and said surface acoustic wave in the other of said first and second polarization converters being identical with each other.

5. A device according to claim 4, wherein:
    said first polarization converter has an interdigital transducer in the vicinity of said output port thereof; and said second polarization converter has an interdigital transducer in the vicinity of said input port thereof;

each of said interdigital transducers of said first and second polarization converters being supplied with a signal having a frequency determining said predetermined wavelength.

6. A device according to claim 4, wherein:

said first polarization converter has an interdigital transducer in the vicinity of said input port thereof; and said second polarization converter has an interdigital transducer in the vicinity of said output port thereof;

each of said interdigital transducers of said first and second polarization converters being supplied with a signal having a frequency determining said predetermined wavelength.

7. A device according to claim 4, wherein:

said first polarization beam splitter further has a second input port, said second input port and said first output of said first polarization beam splitter being coupled by said second polarization plane, said second input port and said second output port of said first polarization beam splitter being coupled by said first polarization plane; and said second polarization beam splitter further has a second output port, said first input port and said second output port of said second polarization beam splitter being coupled by said first polarization plane, said second input port and said second output port of said second polarization beam splitter being coupled by said second polarization plane.

8. A device according to claim 7, wherein:

said first polarization converter has first and second interdigital transducers in the vicinity of said input port and said output port thereof, respectively; and said second polarization converter has first and second interdigital transducers in the vicinity of said output port and said input port thereof, respectively;

each of said first and second interdigital transducers of said first and second polarization converters being supplied with a signal having a frequency determining said predetermined wavelength.

9. A device according to claim 8, wherein the frequency of said signal supplied to each of said first interdigital transducers of said first and second polarization converters is different from the frequency of said signal supplied to each of said second interdigital transducers of said first and second polarization converters.

10. A system comprising:

first to fourth optical fiber transmission lines each adapted to wavelength division multiplexing; and an optical add/drop multiplexer connected to said first to fourth optical fiber transmission lines;

said optical add/drop multiplexer comprising:

a first polarization beam splitter having first and second input ports and first and second output ports, said first and second input ports of said first polarization beam splitter being respectively connected to said first and second optical fiber transmission lines, said first input port and said first output port of said first polarization beam splitter being coupled by a first polarization plane, said first input port and said second output port of said first polarization beam splitter being coupled by a second polarization plane perpendicular to said first polarization plane, said second input port and said first output port of said first polarization beam splitter being coupled by said second polarization plane, said second input port and said second output port of said first polarization beam splitter being coupled by said first polarization plane;

a first polarization converter having an input port and an output port, said input port of said first polarization converter being connected to said first output port of said first polarization beam splitter, said first polarization converter converting said first polarization plane into said second polarization plane concerning light having a predetermined wavelength;

a second polarization converter having an input port and an output port, said input port of said second polarization converter being connected to said second output port of said first polarization beam splitter, said second polarization converter converting said second polarization plane into said first polarization plane concerning light having said predetermined wavelength; and a second polarization beam splitter having first and second input ports and first and second output ports, said first input port of said second polarization beam splitter being connected to said output port of said first polarization converter, said second input port of said second polarization beam splitter being connected to said output port of said second polarization converter, said first input port and said first output port of said second polarization beam splitter being coupled by said second polarization plane, said first input port and said second output port of said second polarization beam splitter being coupled by said first polarization plane, said second input port and said first output port of said second polarization beam splitter being coupled by said first polarization plane, said second input port and said second output port of said second polarization beam splitter being coupled by said second polarization plane;

each of said first and second polarization converters having an optical waveguide structure over which a surface acoustic wave propagates;

the propagation directions of said light and said surface acoustic wave in one of said first and second polarization converters being opposite to each other;

the propagation directions of said light and said surface acoustic wave in the other of said first and second polarization converters being identical with each other.

11. A system according to claim 10, wherein:

said first polarization converter has an interdigital transducer in the vicinity of said output port thereof; and said second polarization converter has an interdigital transducer in the vicinity of said input port thereof;

each of said interdigital transducers of said first and second polarization converters being supplied with a signal having a frequency determining said predetermined wavelength.

12. A device according to claim 10, wherein:

said first polarization converter has an interdigital transducer in the vicinity of said input port thereof; and said second polarization converter has an interdigital transducer in the vicinity of said output port thereof;

each of said interdigital transducers of said first and second polarization converters being supplied with a signal having a frequency determining said predetermined wavelength.

13. A device for wavelength conversion, comprising:

a first polarization beam splitter having an input port and first and second output ports, said input port and said first output port of said first polarization beam splitter being coupled by a first polarization plane, said input port and said second output port of said first polarization beam splitter being coupled by a second polarization plane perpendicular to said first polarization plane;

a first polarization converter having an input port and an output port, said input port of said first polarization converter being connected to said first output port of said first polarization beam splitter, said first polarization converter converting said first polarization plane into said second polarization plane concerning light having a first wavelength;

a second polarization converter having an input port and an output port, said input port of said second polarization converter being connected to said second output port of said first polarization beam splitter, said second polarization converter converting said second polarization plane into said first polarization plane concerning light having said first wavelength;

a second polarization beam splitter having first and second input ports and first and second output ports, said first input port of said second polarization beam splitter being connected to said output port of said first polarization converter, said second input port of said second polarization beam splitter being connected to said output port of said second polarization converter, said first input port and said first output port of said second polarization beam splitter being coupled by said second polarization plane, said first input port and said second output port of said second polarization beam splitter being coupled by said first polarization plane, said second input port and said first output port of said second polarization beam splitter being coupled by said first polarization plane, said second input port and said second output port of said second polarization beam splitter being coupled by said second polarization plane;

a third polarization beam splitter having first and second input ports and first and second output ports, said first input port of said third polarization beam splitter being connected to said second output port of said second polarization beam splitter, said second input port of said third polarization beam splitter being connected to said first output port of said second polarization beam splitter, said first input port and said first output port of said third polarization beam splitter being coupled by said first polarization plane, said input port and said second output port of said third polarization beam splitter being coupled by said second polarization plane, said second input port and said first output port of said third polarization beam splitter being coupled by said second polarization plane, said second input port and said second output port of said third polarization beam splitter being coupled by said first polarization plane;

a third polarization converter having an input port and an output port, said input port of said third polarization converter being connected to said first output port of said third polarization beam splitter, said third polarization converter converting said second polarization plane into said first polarization plane concerning light having a second wavelength having a predetermined relation to said first wavelength;

a fourth polarization converter having an input port and an output port, said input port of said fourth polarization converter being connected to said second output port of said third polarization beam splitter, said fourth polarization converter converting said first polarization plane into said second polarization plane concerning light having said second wavelength;

a fourth polarization beam splitter having first and second input ports and an output port, said first input port of said fourth polarization beam splitter being connected to said output port of said third polarization converter, said second input port of said fourth polarization beam splitter being connected to said output port of said fourth polarization converter, said first input port and said output port of said fourth polarization beam splitter being coupled by said first polarization plane, said second input port and said output port of said fourth polarization beam splitter being coupled by said second polarization plane;

each of said first to fourth polarization converters having an optical waveguide structure over which a surface acoustic wave propagates;

the propagation directions of said light and said surface acoustic wave in each of said first and fourth polarization converters being opposite to each other;

the propagation directions of said light and said surface acoustic wave in each of said second and third polarization converters being identical with each other.

14. A device according to claim 13, wherein:

said first polarization converter has an interdigital transducer in the vicinity of said output port thereof;

said second polarization converter has an interdigital transducer in the vicinity of said input port thereof;

said third polarization converter has an interdigital transducer in the vicinity of said input port thereof; and said fourth polarization converter has an interdigital transducer in the vicinity of said output port thereof;

each of said interdigital transducers of said first to fourth polarization converters being supplied with a signal having a frequency determining said first and second wavelengths.

15. A system comprising:

first and second optical fiber transmission lines; and a wavelength converter connected to said first and second optical fiber transmission lines;

said wavelength converter comprising:

a first polarization beam splitter having an input port and first and second output ports, said input port and said first output port of said first polarization beam splitter being coupled by a first polarization plane, said input port and said second output port of said first polarization beam splitter being coupled by a second polarization plane perpendicular to said first polarization plane;

a first polarization converter having an input port and an output port, said input port of said first polarization converter being connected to said first output port of said first polarization beam splitter, said first polarization converter converting said first polarization plane into said second polarization plane concerning light having a first wavelength;

a second polarization converter having an input port and an output port, said input port of said second polarization converter being connected to said second output port of said first polarization beam splitter, said second polarization converter converting said second polarization plane into said first polarization plane concerning light having said first wavelength;

a second polarization beam splitter having first and second input ports and first and second output ports, said first input port of said second polarization beam splitter being connected to said output port of said first polarization converter, said second input port of said second polarization beam splitter being connected to said output port of said second polarization converter, said first input port and said first output port of said second polarization beam splitter being coupled by said second polarization plane, said first input port and said second output port of said second polarization beam splitter being coupled by said first polarization plane, said second input port and said first output port of said second polarization beam splitter being coupled by said first polarization plane, said second input port and said second output port of said second polarization beam splitter being coupled by said second polarization plane;

a third polarization beam splitter having first and second input ports and first and second output ports, said first input port of said third polarization beam splitter being connected to said second output port of said second polarization beam splitter, said second input port of said third polarization beam splitter being connected to said first output port of said second polarization beam splitter, said first input port and said first output port of said third polarization beam splitter being coupled by said first polarization plane, said input port and said second output port of said third polarization beam splitter being coupled by said second polarization plane, said second input port and said first output port of said third polarization beam splitter being coupled by said second polarization plane, said second input port and said second output port of said third polarization beam splitter being coupled by said first polarization plane;

a third polarization converter having an input port and an output port, said input port of said third polarization converter being connected to said first output port of said third polarization beam splitter, said third polarization converter converting said second polarization plane into said first polarization plane concerning light having a second wavelength having a predetermined relation to said first wavelength;

a fourth polarization converter having an input port and an output port, said input port of said fourth polarization converter being connected to said second output port of said third polarization beam splitter, said fourth polarization converter converting said first polarization plane into said second polarization plane concerning light having said second wavelength;

a fourth polarization beam splitter having first and second input ports and an output port, said first input port of said fourth polarization beam splitter being connected to said output port of said third polarization converter, said second input port of said fourth polarization beam splitter being connected to said output port of said fourth polarization converter, said first input port and said output port of said fourth polarization beam splitter being coupled by said first polarization plane, said second input port and said output port of said fourth polarization beam splitter being coupled by said second polarization plane;

each of said first to fourth polarization converters having an optical waveguide structure over which a surface acoustic wave propagates;

the propagation directions of said light and said surface acoustic wave in each of said first and fourth polarization converters being opposite to each other;

the propagation directions of said light and said surface acoustic wave in each of said second and third polarization converters being identical with each other.

16. A system according to claim 15, wherein:

said first polarization converter has an interdigital transducer in the vicinity of said output port thereof;

said second polarization converter has an interdigital transducer in the vicinity of said input port thereof;

said third polarization converter has an interdigital transducer in the vicinity of said input port thereof; and said fourth polarization converter has an interdigital transducer in the vicinity of said output port thereof;

each of said interdigital transducers of said first to fourth polarization converters being supplied with a signal having a frequency determining said first and second wavelengths.

17. A device for wavelength conversion, comprising:

a plurality of units cascaded;

each of said units comprising:

a first polarization beam splitter having first and second input ports and first and second output ports, said first input port and said first output port of said first polarization beam splitter being coupled by a first polarization plane, said first input port and said second output port of said first polarization beam splitter being coupled by a second polarization plane perpendicular to said first polarization plane, said second input port and said first output port of said first polarization beam splitter being coupled by said second polarization plane, said second input port and said second output port of said first polarization beam splitter being coupled by said first polarization plane;

a first polarization converter having an input port and an output port, said input port of said first polarization converter being connected to said first output port of said first polarization beam splitter, said first polarization converter converting said first polarization plane into said second polarization plane concerning light having a predetermined wavelength;

a second polarization converter having an input port and an output port, said input port of said second polarization converter being connected to said second output port of said first polarization beam splitter, said second polarization converter converting said second polarization plane into said first polarization plane concerning light having said predetermined wavelength; and a second polarization beam splitter having first and second input ports and first and second output ports, said first input port of said second polarization beam splitter being connected to said output port of said first polarization converter, said second input port of said second polarization beam splitter being connected to said output port of said second polarization converter, said first input port and said first output port of said second polarization beam splitter being coupled by said second polarization plane, said first input port and said second output port of said second polarization beam splitter being coupled by said first polarization plane, said second input port and said first output port of said second polarization beam splitter being coupled by said first polarization plane, said second input port and said second output port of said second polarization beam splitter being coupled by said second polarization plane;

each of said first and second polarization converters having an optical waveguide structure over which a surface acoustic wave propagates;

the propagation directions of said light and said surface acoustic wave in one of said first and second polarization converters being opposite to each other;

the propagation directions of said light and said surface acoustic wave in the other of said first and second polarization converters being identical with each other.

18. A device for wavelength conversion, comprising:

a plurality of units arranged in a matrix;

each of said units comprising:

a first polarization beam splitter having first and second input ports and first and second output ports, said first input port and said first output port of said first polarization beam splitter being coupled by a first polarization plane, said first input port and said second output port of said first polarization beam splitter being coupled by a second polarization plane perpendicular to said first polarization plane, said second input port and said first output port of said first polarization beam splitter being coupled by said second polarization plane, said second input port and said second output port of said first polarization beam splitter being coupled by said first polarization plane;

a first polarization converter having an input port and an output port, said input port of said first polarization converter being connected to said first output port of said first polarization beam splitter, said first polarization converter converting said first polarization plane into said second polarization plane concerning light having a predetermined wavelength;

a second polarization converter having an input port and an output port, said input port of said second polarization converter being connected to said second output port of said first polarization beam splitter, said second polarization converter converting said second polarization plane into said first polarization plane concerning light having said predetermined wavelength; and a second polarization beam splitter having first and second input ports and first and second output ports, said first input port of said second polarization beam splitter being connected to said output port of said first polarization converter, said second input port of said second polarization beam splitter being connected to said output port of said second polarization converter, said first input port and said first output port of said second polarization beam splitter being coupled by said second polarization plane, said first input port and said second output port of said second polarization beam splitter being coupled by said first polarization plane, said second input port and said first output port of said second polarization beam splitter being coupled by said first polarization plane, said second input port and said second output port of said second polarization beam splitter being coupled by said second polarization plane;

each of said first and second polarization converters having an optical waveguide structure over which a surface acoustic wave propagates;

the propagation directions of said light and said surface acoustic wave in one of said first and second polarization converters being opposite to each other;

the propagation directions of said light and said surface acoustic wave in the other of said first and second polarization converters being identical with each other.

* * * * *